United States Patent [19]

Jones et al.

[11] 4,067,490

[45] Jan. 10, 1978

[54] QUALITY CONTROL METHOD FOR INERTIAL WELDING

[75] Inventors: Thaddeus M. Jones, South Bend, Ind.; Jozef Kiwale, Moylan, Pa.; Ernest J. Ruder, Pekin, IL

[73] Assignee: Caterpillar Tractor Co., Peoria, Ill.

[21] Appl. No.: 680,941

[22] Filed: Apr. 28, 1976

Related U.S. Application Data

[60] Continuation of Ser. No. 513,523, Oct. 10, 1974, abandoned, which is a division of Ser. No. 474,844, May 30, 1974, Pat. No. 3,888,405, which is a continuation-in-part of Ser. No. 286,312, Sept. 5, 1972, abandoned.

[51] Int. Cl.$^2$ ............................................. B23K 19/02
[52] U.S. Cl. ................................... 228/102; 228/113
[58] Field of Search ................... 228/2, 102, 112, 113, 228/114

[56] References Cited

U.S. PATENT DOCUMENTS

| | | | |
|---|---|---|---|
| 3,591,068 | 11/1968 | Farmer et al. | 228/2 |
| 3,623,213 | 11/1971 | Sciaky et al. | 228/102 |
| 3,623,214 | 11/1971 | Sciaky et al. | 228/102 |
| 3,678,566 | 7/1972 | Ellis et al. | 228/102 |

OTHER PUBLICATIONS

Justice "Design Control" Metal Progress, July 1968, pp. 91–94.

Primary Examiner—Harold D. Whitehead
Assistant Examiner—K. J. Ramsey
Attorney, Agent, or Firm—Phillips, Moore, Weissenberger, Lempio & Majestic

[57] ABSTRACT

A method and apparatus for maintaining quality control in a friction welding operation where two workpieces are relatively rotated while being constantly pressed into engagement at a common interface. One or more operating conditions, including axial upset at the common interface, are monitored and a signal is substantially instantaneously produced to indicate correlation between the monitored operating conditions and respective ranges for those conditions which are predetermined as being representative of an effective bond between the workpieces. In a first embodiment, operating conditions of axial upset, pressure of engagement between the workpieces and relative rotating speed are simultaneously monitored. In a second embodiment, axial upset is monitored in selectively delayed relation to commencement of the weld in order to provide improved quality control over inertia welding.

4 Claims, 7 Drawing Figures

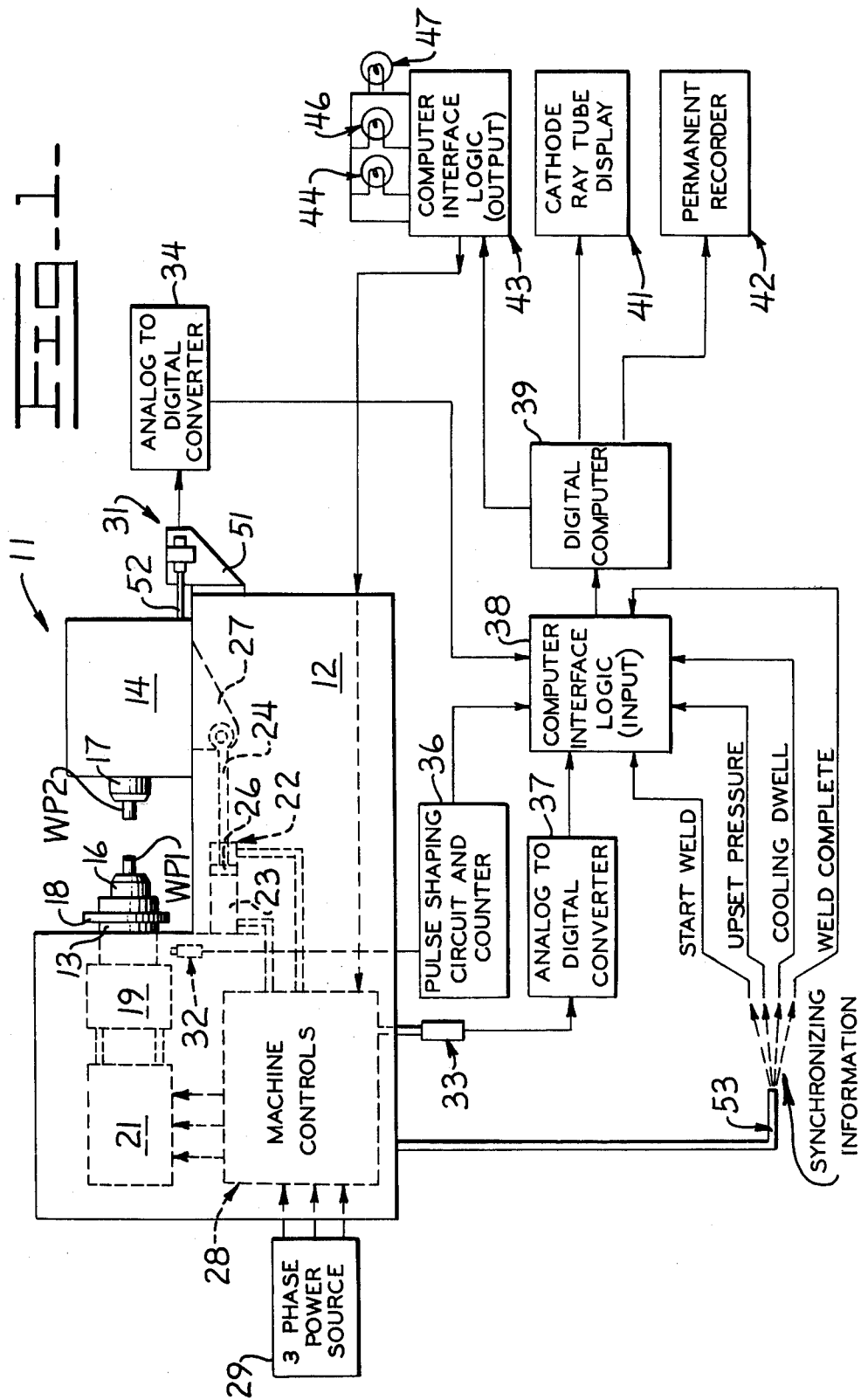

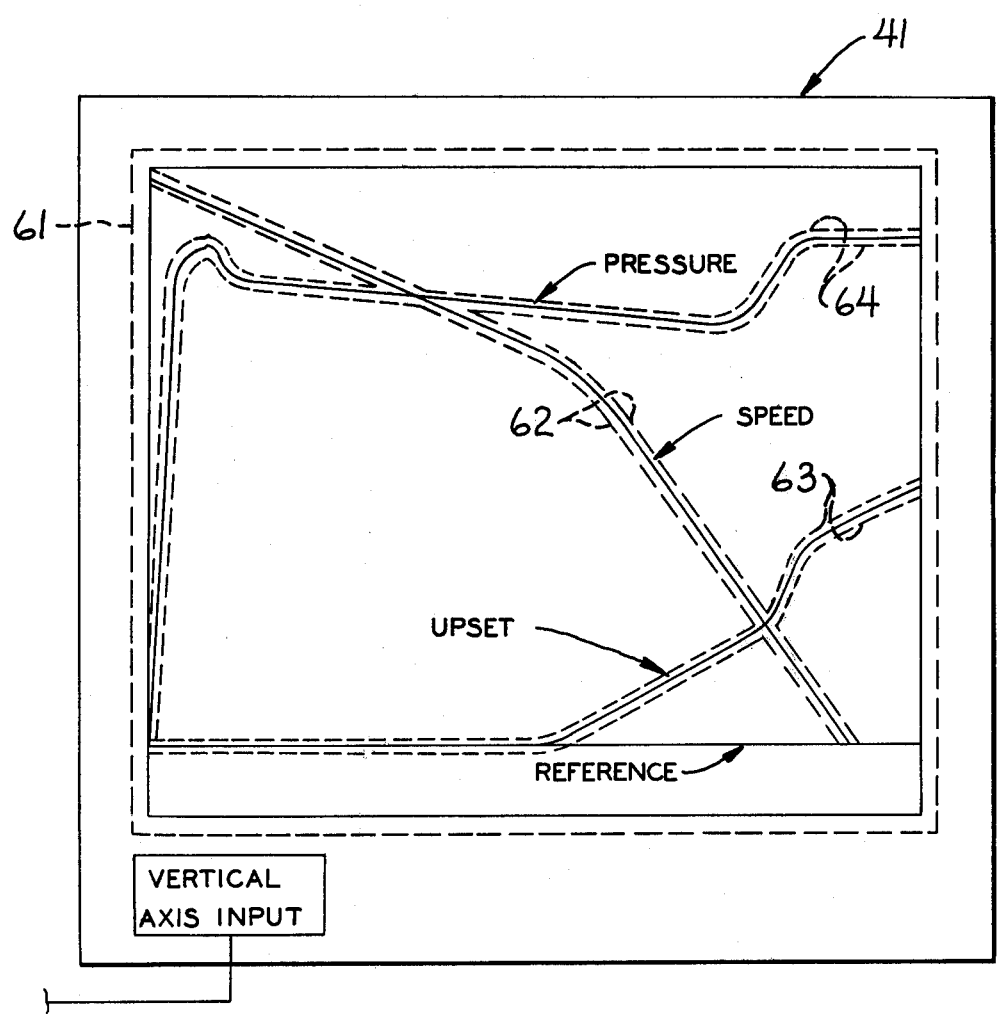

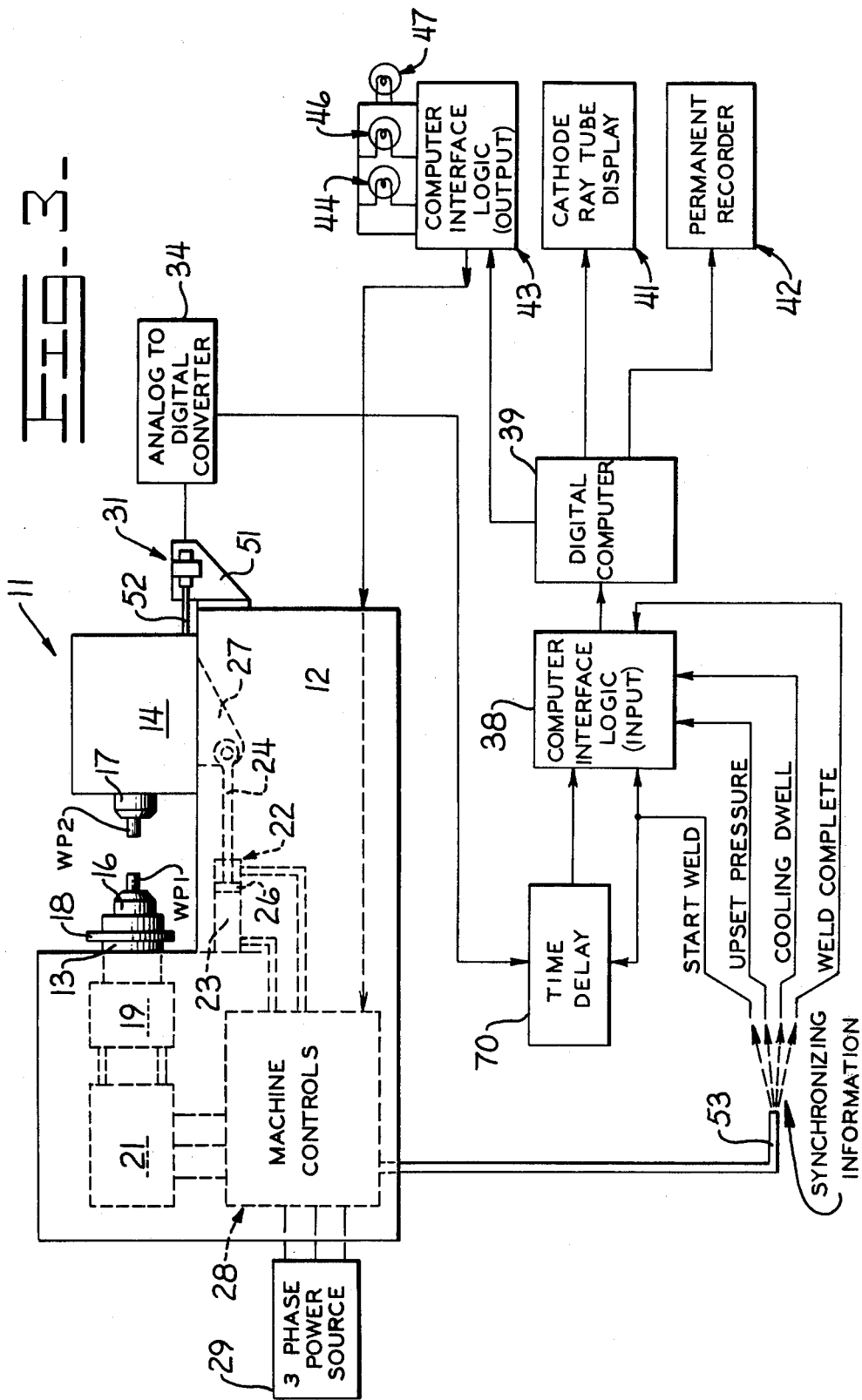

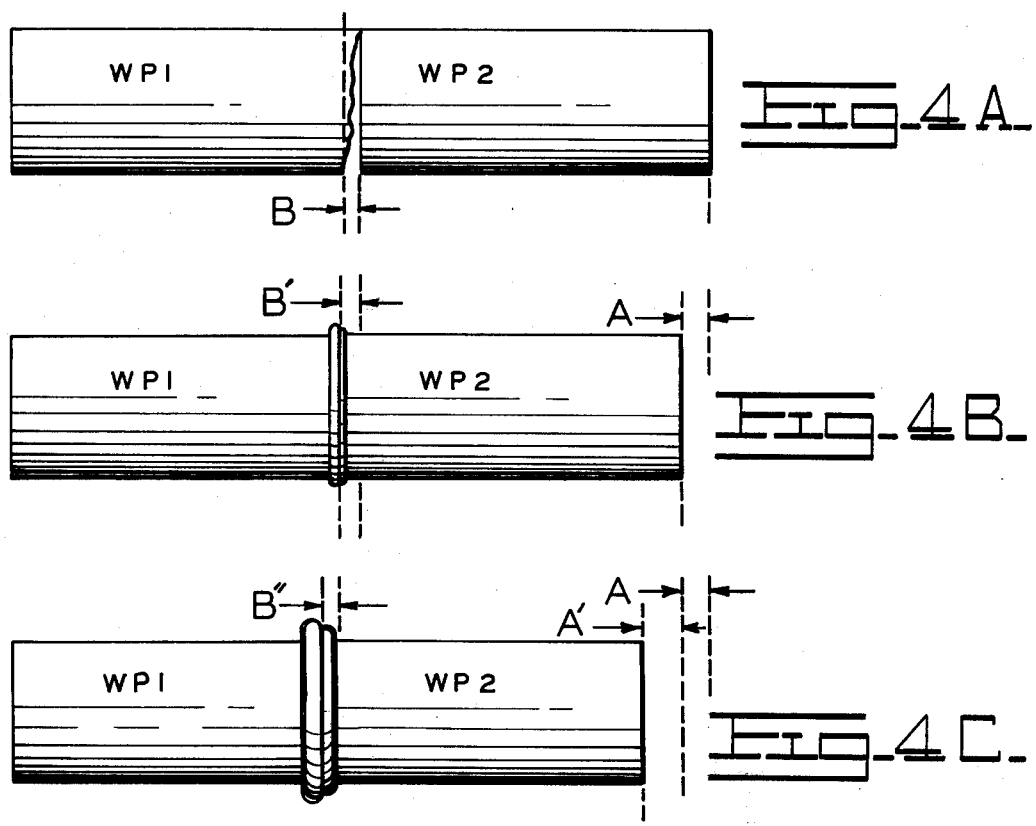
Fig. 4A.
Fig. 4B.
Fig. 4C.
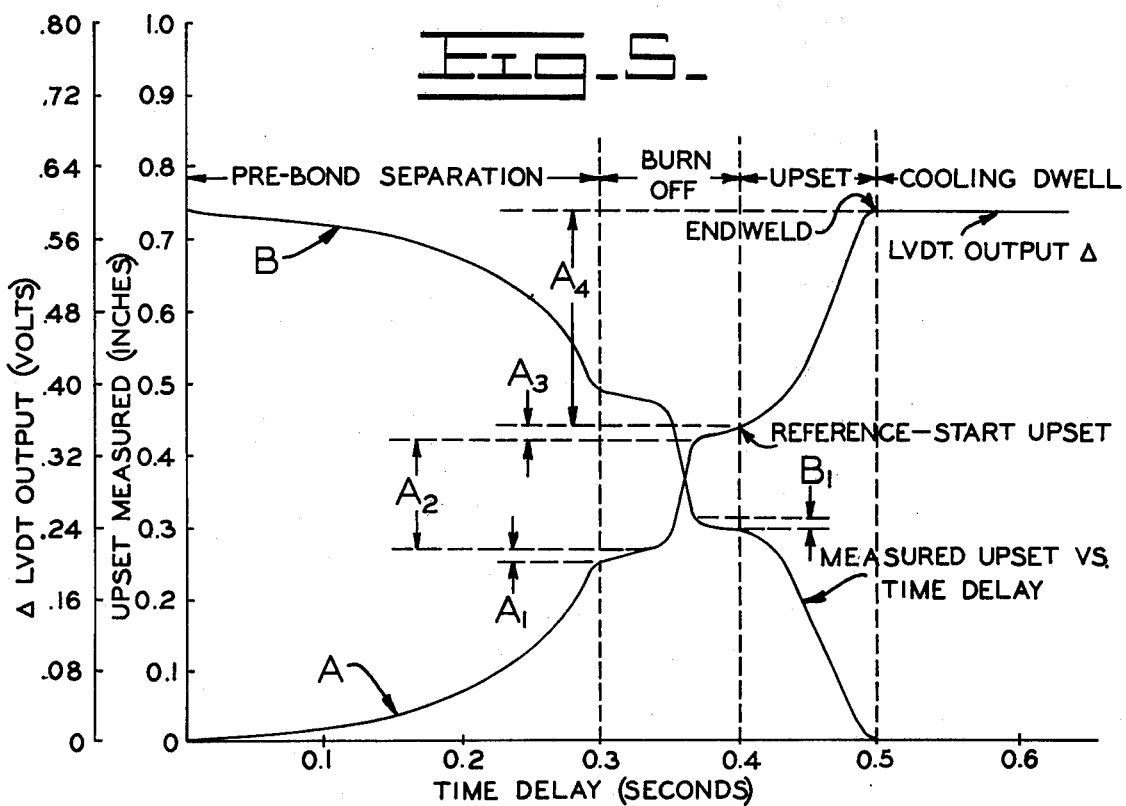
Fig. 5.

QUALITY CONTROL METHOD FOR INERTIAL WELDING

This is a continuation of Ser. No. 513,523, filed Oct. 10, 1974, now abandoned which is division of Ser. No. 474,844 filed May 30, 1974 now U.S. Pat. No. 3,888,405; which is a continuation-in-part of U.S. Pat. application, Ser. No. 286,312, filed Sept. 5, 1972 and now abandoned.

BACKGROUND OF THE INVENTION

The present invention relates to a method and apparatus for maintaining quality control in a friction welding operation, particularly inertial welding operations for which a simplified version of the present invention is especially adapted.

The invention also relates, possibly in a more specific way, to computerized apparatus which substantially instantaneously provides a signal indicating whether one or more operating conditions are within predetermined limits indicating an acceptable bond formed at the interface of the workpieces. In association with a friction welding machine including control means for automatically repeating a friction welding operation, the computerized apparatus may be employed to terminate operation of the machine if an operating condition is outside of acceptable limits during a welding operation.

A brief review of different types of friction welding is set forth below in order to more accurately define the present invention. Two types of friction welding are commonly referred to as conventional friction welding and inertial welding.

In a conventional friction welding operation, one workpiece is rotated against another workpiece at a relatively constant speed and under a relatively constant axial load until the interface between the workpieces is heated to a plastic condition. Relative rotation between the workpieces is then rapidly stopped. The axial load may then be increased to improve the strength of the bond at the interface.

Inertial welding refers to a process wherein energy for accomplishing a bond between two workpieces is provided by a rotating inertial mass. The inertial mass is accelerated to a selected speed to store a predetermined amount of energy. The workpieces are then pressed together by an axial load while inertial energy stored in the rotating mass is consumed at the interface to produce frictional heating and plastic working of the interface. The rotational speed of the inertial mass continuously decreases and the entire energy of the inertial mass is preferably consumed at the interface of the workpieces. However, in certain applications, only a selected portion of the energy in the inertial mass is consumed at the interface.

The present invention is particularly concerned with the specific operation described above. For example, the type of bond accomplished by inertial welding may be simulated as illustrated in one instance by U.S. Pat. No. 3,542,274, issued on Nov. 24, 1972 and assigned to the assignee of the present invention. That patent refers to a speed-programmed friction welder wherein the relative speed of rotation between two workpieces is closely controlled by electronic means.

A comparison of the speed-programmed weld cycle of the above-noted patent with an inertial welding operation indicates that both operations are generally characterized by the relative speed of rotation between the workpieces being varied in a substantially predetermined manner from an initial, relatively high speed with low torque at the interface to a relatively low speed with high torque at the interface, a bond being substantially completed between the workpieces at their interface as relative rotation ceases.

SUMMARY OF THE INVENTION

The present invention particularly contemplates a method and apparatus of quality control in an inertial welding process or similar welding operation characterized by two workpieces being relatively rotated in rubbing contact at a common interface while being continuously pressed together, the relative speed of rotation between the workpieces varying in a substantially predetermined manner from an initial, relatively high speed with low torque at the interface to a relatively low speed with high torque at the interface, a bond being substantially completed between the workpieces at their interface as relative rotation ceases. Within such an operation, metallurgical quality of the bond has been found to be closely related to the amount of upset or relative axial movement occuring between the workpieces at their interface during the welding process.

Accordingly, to provide a substantially instantaneous indication of weld quality, the present invention contemplates monitoring the amount of relative axial movement between the workpieces during the welding process after the workpieces are initially engaged and providing a substantially instantaneous signal indicating correlation between the actual upset and an upset range predetermined as being indicative of an effective bond between the workpieces.

Preferably, the amount of upset is measured following a suitable delay after initiation of the weld cycle, the amount of delay being selectively variable depending on the characteristics of the workpieces and the particular parameters of the weld cycle, in order to provide more accurate quality control in the finished weld.

The invention more particularly contemplates a computerized control apparatus for maintaining quality control in friction welding machines of either the inertial or conventional type including transducer means for monitoring the conditions of relative rotating speeds between the workpieces, fluid operating pressure urging the workpieces into engagement and axial upset at the interface of the two workpieces during the weld cycle, computer means receiving signals from the respective transducer means with signal means being coupled to the computer means for providing a substantially instantaneous signal corresponding to each of the monitored conditions.

Other objects and advantages of the present invention are made apparent in the following description having reference to the accompanying drawing.

BRIEF DESCRIPTION OF THE DRAWING

FIG. 1 is a schematic representation of an inertial welding machine and quality control apparatus according to the present invention, the quality control apparatus also being illustrative of a method according to the present invention.

FIG. 2 is a fragmentary view of a preferred signal means within such quality control apparatus.

FIG. 3 is a schematic representation of an alternate embodiment of quality control apparatus according to the present invention, the apparatus of FIG. 3 being illustrative of an alternate method of operation according to the present invention.

FIGS. 4A, 4B, and 4C sequentially illustrate the axial displacement between a pair of workpieces during a typical inertial welding cycle.

FIG. 5 graphically represents both the actual sequential axial displacement which is pictorially illustrated in FIGS. 4A–4C as well as an electronic signal representative of upset displacement between the workpieces.

DESCRIPTION OF THE EMBODIMENT OF FIG. 1

The method and apparatus of the present invention is described with particular reference to an inertial welding machine of the type indicated at 11 in FIG. 1. The welding machine 11 has a frame 12 supporting a rotatable spindle 13 and a movable tailstock assembly 14. One workpiece WP1 is supported for rotation by a chuck 16 mounted upon the spindle 13. The outer workpiece WP2 is supported by a non-rotating chuck 17 which is secured to the tailstock fixture 14.

A replaceable flywheel 18 is also mounted upon the spindle 13 for rotation with the one workpiece WP1 to provide a variable inertial mass selected in accordance with conventional parameters which are well known to those familiar with inertial welding technology. The spindle 13 is driven in rotation by a hydraulic motor 19 with hydraulic fluid under pressure being supplied to operate the motor 19 by a hydraulic power source 21.

Axial motion of the tailstock fixture 14 upon the frame 12 is controlled by a hydraulic ram 22 including a cylinder 23 secured to the frame 12. A rod 24 is secured to a movable piston 26 in the cylinder and penetrates one end of the cylinder 23 for connection to a bracket 27 which is affixed to the tailstock assembly 14.

The machine described above is illustrative of friction welding operations where two workpieces are relatively rotated while being urged into engagement with each other to form a bond at their interface. In inertial welding operations, energy for accomplishing the bond is preferably stored in the rotating mass 18 by operation of the motor 19. The workpieces WP1 and WP2 are then brought into axial engagement by retraction of the piston 26 within the cylinder 23 to shift the tailstock assembly 14 leftwardly towards the spindle. Energy from the flywheel 18 is consumed at the interface of the workpieces, the relative speed of rotation between the workpieces varying in a substantially predetermined manner from an initial, relatively high speed with low torque at the interface to a relatively low speed with high torque at the interface, a bond being substantially completed between the workpieces at their interface as relative rotation of the workpieces ceases.

The bonded workpieces may be left in the chucks 16 and 17 for a relatively short period of time, referred to as "cooling dwell" and denoting a period of time necessary to adequately cool the bonded workpieces in order to preserve dimensional stability after they are removed from the machine.

Operation of the hydraulic source 21 and the hydraulic ram 22 are preferably regulated by an automatic control assembly indicated at 28 with an electrical power source 29 and including manually operated components or switches (not shown) to initiate and terminate various welding operations. Preferably, the machine controls are of the type for automatically repeating operation of a welding operation within the machine 11. A control mechanism of somewhat similar character and illustrative of the control assembly 28 is described in U.S. Pat. No. 3,542,274.

As noted above, during a friction welding process for joining metal workpieces, certain parameters or conditions of the welder operation are critical to the formation of a proper bond between the workpieces. These conditions are variable depending for example, upon the cross-section of the workpieces and their composition. However, the conditions may be predetermined for any particular welding operation. Conditions which are critical parameters in friction welding operation include the relative speed of rotation between the two weld pieces during the welding operation. In the machine illustrated in FIG. 1, the relative speed of rotation between the weld pieces is provided by the operating speed by the spindle 13. Another condition is the pressure with which the workpieces are axially urged together during the welding operation. This pressure corresponds substantially to hydraulic pressure in the hydraulic ram 22.

Another condition is the amount of axial upset occuring at the interface between the workpieces WP1 and WP2 which may be determined by the amount of relative axial movement occuring between the workpieces during the welding process after the workpieces are initially engaged. This condition is of particular importance as an indication of the quality of a bond formed between the workpieces. Further, the amount of upset occuring during the welding process is particularly indicative of the quality of a bond performed by an inertial welding operation in a machine such as that illustrated in FIG. 1.

The present invention contemplates the use of transducers such as those indicated generally at 31, 32 and 33 for respectively monitoring axial upset between the workpieces, relative rotating speed of the workpieces and pressure with which the workpieces are urged toward each other. Monitoring signals from these transducers are conditioned by separate analog-to-digital converter means 34, 36 and 37 as well as a computer input logic interface 38 for transmission to a digital computer 39. For example, a signal corresponding to each of the monitored conditions may be instantaneously displayed for example, by means of an oscilloscope indicated at 41. A permanent record of the operating conditions may also be provided by permanent recorder means 42 which may be a digital tape recorder, typewriter or digital recorder, for example.

Still further, a computer output logic interface 43 may operate a plurality of lamps 44, 46, and 47 for example, to provide an instantaneous indication of quality within a bond completed by the machine 11. Additionally, the output interface means 43 may also be employed to signal the control assembly 28 to interrupt operation of the weld machine 11 when operating parameters indicate an unsatisfactory weld.

To review the components discussed above in greater detail, the transducer 31 may be a linear displacement or position transducer which is mounted upon the frame 12 by a bracket 51 and has a movable member 52 secured to the tailstock fixture 14. The transducer 31 is preferably a linear variable displacement transducer (LVOT) coupled with the converter 34 to provide a DC voltage signal proportional to axial movement between the workpieces 16 and 17 after they are initially engaged by the hydraulic ram 22. The DC signal from the transducer 31 is digitized by the converter 34 and delivered to the computer 39 through the input interface 38.

Similarly, the transducer 32 may be a tachometer for providing a DC voltage proportional to rotating speed of the spindle 13. The DC signal from the transducer 32 passes through converter means 36 which performs a shaping and counting function with the resulting signals being passed to the computer 39 through the input interface 38. The transducer 33 provides a DC voltage signal proportional to pressure in the hydraulic means 32 with which the workpieces WP1 and WP2 are axially urged together during the welding operation. The signal from the transducer 233 is digitized by the converter 37 and passed to the computer 39 by means of the input interface 38.

Additional synchronizing information is also delivered to the computer 39 by the branched connection from the control assembly 28 as indicated at 53. This synchronizing information is designed to condition the quality control apparatus so that various components in the quality control apparatus are properly adjusted to monitor the selected conditions. The synchronizing information includes the time at which the weld is commenced, the time at which upset pressure is developed between the workpieces WP1 and WP2 after their initial engagement, the commencement of the cooling dwell period at which time it is no longer necessary to monitor the various conditions and the time at which the weld is completed. This final synchronizing signal may be employed to reset or adjust the entire quality control combination for a new welding operation.

The digital computer 39 always serves the functions of permanently storing "nominal" weld information, processing and storing production part information during each type weld operation and providing a signal that indicates whether the upset length is too short, nominal, or too long. Although primary machine variables of the type discussed above will normally be displayed, it may be desirable to display computed variable (e.g. torque) which can be calculated from the input data and welder physical constants. When collecting nominal part information for a particular type welding operation, the digital computer 39 is caused to hold the machine information permanently at the end of each cycle. During production operation of the display, all data pertaining to the current type operation is destroyed as the collection of data for the next type operation commences.

The computer 39 and various converters employed in the quality control combination may be of generally well known construction to perform the functions described above. As noted above, an output signal from the computer 39 may be fed to the instantaneous display means 41, the permanent recording means 42 or the output interface means 43.

The present invention particularly contemplates the provision of a signal indicating correlation between the monitored conditions and ranges for each of those conditions which are predetermined as being representative of an effective bond between the workpieces. One method of providing such a signal is illustrated for example in FIG. 2. In that figure, the graticule or shield 61 in the oscilloscope has dashed lines as indicated generally at 62, 63 and 64 which indicate an acceptable range for trace signals corresponding to the various conditions of relative speed, axial upset and pressure. With the horizontal sweep rate and vertical gain adjustment of the oscilloscope being properly set for a particular welding operation, the trace for each of the monitored conditions will fall within the corresponding range during a properly controlled welding operation with the operator being able to instantly observe any deviation of the monitored condition from suitable limits. It is noted that other means could perform a similar function. For example, the computer means 39 could be programmed to compare each of the traces with predetermined limits in order to detect any deviation in the monitored conditions.

The lamps 44, 46, and 47 which are coupled to the computer means 39 through the output interface 43 provide an additional means of indicating an abnormal condition during a welding operation. For example, the lamps in FIG. 1 are respectively actuated to determine whether upset between the workpieces as monitored by the transducer 31 is within a satisfactory range, exceeds the acceptable predetermined range or falls below the predetermined range. Similar sets of signal lamps could also be employed for the other monitored conditions such as operating speed and upset pressure.

It is also contemplated that the instantaneous display means 41 is an oscilloscope of the storage type so that the various traces indicating each of the monitored conditions remains upon the scope until a manual reset button (not shown) is actuated to condition the oscilloscope 41 for a new weld cycle. Thus, the oscilloscope 41 provides the operator with a means of studying the character of traces for any given welding operation.

During operation of the circuit illustrated in FIG. 1, the input interface 38 and computer 39 are responsive to the simultaneous presence of "start weld"(machine reaches weld speed) and "upset pressure" (parts touch) signals from the control assembly 28 to store information relating to "upset", "speed" and "pressure". At the same time, signals from the respective transducers indicated at 34, 36, 37 are transmitted to the visual display 41 during the weld period. The visual display 41 as also indicated above, may be a storage oscilloscope with marked graticule to define parameter limits.

The computer circuitry also retains the upset signal from 34, that is present when the parts touch, as a reference. When the weld is complete and the "cooling dwell" signal is received by the input interface 38, the computer circuitry compares the upset signal present at that time with the previously stored upset reference and holds the difference signal (total upset) in memory. Information relating to speed and pressure may also be stored at that time.

The "weld complete" signal conditions the computer circuitry to release all stored information to the recorder device 42 and simultaneously feeds the total upset signal to the output logic interface 43 which indicates whether total upset is in the acceptable range. Acceptable upset is visually indicated by one of the lamps 44, 46, or 47 which also serve to indicate if actual upset is above or below an acceptable range. At the same time, the output interface 43 will produce a shutdown signal which conditions the machine controls 28 to prevent automatically recycle of the weld machine 11.

The Embodiment of FIG. 3

The computer circuitry, recorder 42, display 41 and output interface 43 function in substantially the same manner described above with reference to FIG. 1. The computer circuit is conditioned by the same signals except that when weld speed is reached, the "start weld" signal is transmitted through a time delay circuit or timer unit 70 arranged between the transducer 34 and input interface 38. Thus, although the computer is ready to receive and process data when the "upset pressure" signal is present actual monitoring is not commenced until after a predetermined delay established by the timer 70 at which time the upset signal is passed to interface 38.

The timer 70 selectively delays monitoring of the upset signal to allow adequate time for the hydraulics to cause engagement between the workpieces and for rough burn-off to occur at their interface before a signal is passed to the computer circuitry to establish the upset reference. Therefore, the upset measurement signal seen by devices 41, 42, 43 represents that part of the change in output voltage of the LVDT 31 that occurs after the parts engage and the interface between WP1 and WP2 is properly conditioned for the start of upset measurement.

The time delay circuit 70 could be triggered for example, by the "upset pressure" signal but a relatively short delay period would then be necessary. Accordingly, the timer 70 is preferably triggered by the "start weld" signal since a longer and more accurately determined time delay is then involved.

The timing function could be achieved by any of several commercial electrical, electronic, electro-mechanical or electro-pneumatic devices capable of being triggered by an electrical signal. However, the timer 70 is preferably of an electronic type employing an adjustable RC network as an input to actuate a uni-junction transistor, for example, because of its excellent accuracy and response. Such an electronic timer is manufactured by Eagle Signal Co., as Model CG2A602.

The relative positions of the workpieces in FIGS. 4A 4B and 4C are illustrative of upset occurring during a weld. The abutting surface of workpiece WP1 is rough and uneven while that of WP2 is relatively smooth and well defined. The dimension B indicates that approximately ⅛ inch of movement WP2 must occur to burn off surface projections on the workpiece WP1 before metal-to-metal contact is assured over the total interface between the two workpieces.

FIG. 4B represents the condition of the workpieces where it is proper to start upset measurment. WP2 has moved leftwardly a distance B' that is slightly greater than B which causes a slight amount of flash and establishes a condition where there is even heating over the entire interface area.

FIG. 4C shows the completed weld with approximately ¼ inch of monitored upset or displacement. During this operation equal amounts of flash are produced from both workpieces so that each is foreshortened by approximately ⅛ inch.

FIG. 5 graphically represents the same weld indicated in FIGS. 4A-4C with fixed representative parameters as noted below and wherein the time delay is adjustable. The LVDT 31 is capable of measuring 1 inch of displacement and its output changes 80 millivolts for each 0.1 inch of displacement. The pre-bond gap between weld pieces is 0.25 inch, the weld cycle from application of ram pressure to completion of weld is 0.5 sec., the hydraulic system causes the parts to engae in 0.3 seconds. Desired burn-off distance is 0.1875 inches and desired upset is 0.3 inches. Time delay is set at 0.4 seconds.

Curve A shows the change in voltage output of the LVDT 31 from the time axial movement of workpiece WP2 commences until the end of the weld cycle. Curve B represents the amount of upset that would be measured with the time delay being varied from Zero time (ram pressure applied) to 0.5 seconds (end of weld cycle).

For example, if the timer were set at Zero delay, measurement would start with pressure application to initiate movement of the workpiece WP2 and the measured upset would include initial separation between the workpieces, burn-off and upset or a total of approximately 0.7375 inches. With the time delay set at 0.3 seconds, measurement would start at approximately the time the pieces touch and the measurement would be 0.4875 (burn-off plus upset).

When the parts engage, it may be seen from Curve A that tailstock motion slows and Δ LVDT Output is negligible during the initial part of the burn-off period (trace portion $A_1$). Subsequently, some upset occurs till the parts are in total contact at the interface (portion $A_2$). Thereafter, the rate of tailstock motion is reduced and Δ LVDT Output is again negligible for a short period (portion $A_3$) while the parts heat. The Δ LVDT Output then rises sharply in the ensuing upset period (portion A4).

With the time delay set to 0.4 seconds, the upset reference is established as the instant, output level of the LVDT at that time. This signal value is compared with the voltage level at the end of the weld when the LVDT output is no longer changing to give total upset.

In most instances, an upset tolerance of ±.005 to ±.010 inches is acceptable in order to maintain relatively high quality control over the weld. It will be noted that the line B representing theoretical upset is a mirror image of the line representing Δ LVDT output so that line portion B1 corresponds to line portion A3. It may therefor be seen that the time delay could be set at any point between approximately 0.37 and 0.4 seconds and the final upset measurment would still remain within acceptable limits for the particular parameters of the illustrated weld cycle.

It is desirable to set the time delay at a point to insure that all of the final upset is measured.

For any particular welding operation, the time delay may be determined by running 5 or 6 weld cycles and comparing upset derived from measurement of the joined workpieces with the monitor reading. A predetermined delay setting may then be maintained for the particular operation. Generally, a time delay as short as 0.15 seconds is proper for parts of small cross section such as valve stems or thin wall tubing while the delay may be as long as one second or more for applications involving parts of greater section such as 2–4 inch diameter solid rod or large diameter, heavy walled tubing.

We claim:

1. In an inertial welding process of the type wherein, during each of the plurality of repetitive cycles, two workpieces are relatively rotated in rubbing contact at a common interface solely by means of a rotating inertial mass while being continuously pressed together, an improved method of maintaining quality control during repetitious cycles of said inertial welding process comprising the steps of:

Monitoring the amount of relative axial movement between the workpieces after initial engagement of the workpieces to determine axial upset during the welding process;

Comparing axial upset amount with an upset range predetermined as being representative of an effective bond between the workpieces.

Producing a substantially instantaneous signal indicating correlation between the axial upset amount and the predetermined upset range;

Monitoring the relative speed of rotation between the two workpieces and pressure under which the two workpieces are axially engaged, simultaneously with monitoring of axial movement between the parts;

Comparing the relative speed of rotation and the axial pressure with respect to predetermined ranges which are representative of an effective bond between the work pieces;

Producting substantially instantaneous signals indicating correlation of the monitored relative speed of rotation and axial pressure with the predetermined ranges for these conditions;

Conditioning repetition of the welding operation upon maintenance of axial upset amount, relative speed and axial engagement pressure within their respective predetermined ranges during each cycle;

Permanently recording axial upset amount, between the workpieces; and

Displaying a continuous signal for each weld operation to indicate when axial upset amount is within and outside the predetermined upset range.

2. In an inertial welding process of the type wherein during each of a plurality of repetitive cycles, two workpieces are relatively rotated in rubbing contact at a common interface solely by means of a rotating inertial mass while being continuously pressed together, an improved method of maintaining quality control during repetitive cycles of said inertial welding process comprising the steps of:

Monitoring the amount of relative axial movement between the workpieces to determine axial upset amount during each welding cycle and generating an electrical signal proportional to the axial upset amount between the workpieces;

communicating said signal through a start time delay means effective to prevent transmission of the signal therethrough for a predetermined time period after initial engagement of workpieces;

communicating an output signal from the start time delay means;

comprising said output signal from the start time delay means with a signal predetermined as being representative of an effective bond between the workpieces;

producing a substantially instantaneous signal indicating correlation between the axial upset amount and the predetermined upset range; and conditioning repetition of the welding operation upon maintenance of said axial upset amount signal within the predetermined range representative of a effective bond; the predetermined time period being selected in accordance with the characteristics of the workpieces and the parameters of the particular weld cycle in order to provide more accurate quality control in the finished weld.

3. A method as in claim 2 further comprising the step of permanently recording the signal proportional to axial upset amount between the workpieces.

4. A quality control method as in claim 3, wherein said start time delay means is adjusted to prevent start of said comparing for approximately one second when the workpieces are steel parts having an interface area of approximately 3–12 square inches.

* * * * *